Fig. 1.

Feb. 10, 1942. H. D. STEVENS 2,272,881
TUBE SPLICING APPARATUS
Filed May 13, 1938 7 Sheets-Sheet 3

INVENTOR
Horace D. Stevens
BY
ATTORNEY

Feb. 10, 1942.    H. D. STEVENS    2,272,881
TUBE SPLICING APPARATUS
Filed May 13, 1938    7 Sheets-Sheet 5

Fig. 8.

INVENTOR
Horace D. Stevens

Feb. 10, 1942.  H. D. STEVENS  2,272,881
TUBE SPLICING APPARATUS
Filed May 13, 1938  7 Sheets-Sheet 6

INVENTOR
Horace D. Stevens
BY
ATTORNEY

Patented Feb. 10, 1942

2,272,881

UNITED STATES PATENT OFFICE 2,272,881

TUBE SPLICING APPARATUS

Horace D. Stevens, Akron, Ohio, assignor to The Firestone Tire & Rubber Company, Akron, Ohio, a corporation of Ohio Application May 13, 1938, Serial No. 207,774

7 Claims. (Cl. 154—9)

This invention relates to tube splicing apparatus, and more especially it relates to improved mechanism for removing surplus stock from opposite ends of a length of unvulcanized rubber tubing, and then moving the trimmed ends of the tube forcibly into abutting relation to effect a butt splice, whereby the tubing is caused to become endless in form.

The chief objects of the invention are to provide an improved apparatus for severing the surplus stock from the ends of a length of tubing; to provide improved apparatus for moving the tube ends into abutting relation; to provide improved means for disposing of the trimmings from the tube-ends; and to provide an apparatus of the character mentioned that automatically will perform a cycle of tube-splicing operations after manually being set into operation. Other objects will be manifest as the specification proceeds.

Referring to the drawings, there is shown a hollow, pedestal support 10, and mounted upon the top thereof, at its front margin and somewhat to left of center, is an upstanding bearing bracket 11. Pivotally mounted at 12 in the top of bracket 11 is an angular arm 13, the free end portion of said arm being substantially perpendicular to the pivoted end portion thereof. At the pivoted end of arm 13 is a counterweight 14 arranged normally to hold the pivoted end portion of the arm substantially in vertical position, as shown in Figures 1, 2, 7, and 9, the free end of the arm then extending forwardly. A spring-backed rest 15 on bracket 11 is provided for the said counterweight. The arm 13 is arranged to be swung angularly upon its pivot 12 in a vertical plane, and to this end a hand-grip structure 16 is mounted upon the free end thereof. Also mounted upon the free end of arm 13 is a cutter structure consisting of a pair of parallel knife blades 17, 17, and a presser plate 18 disposed between the said blades and projecting somewhat beyond the cutting edges thereof, the presser plate being yieldingly mounted so as to be retractible under pressure. Preferably an electrical heating element is mounted in the cutter structure for heating the blades 17 whereby the trimming of the work is facilitated, and the trimmed faces of the work are left in tacky condition. The cutter blades are disposed parallel to the plane of movement of the arm 13, their longitudinal margins being disposed substantially at right angles to the free end-portion of the arm, the outer longitudinal margin of each blade being sharpened.

Mounted upon the top of pedestal 10, beside bracket 11 and to the left thereof as viewed from the front of the apparatus, is a bracket-like bearing structure 20 that has two forwardly-extending, vertically aligned arms 21, 22 disposed in overhanging relation to front of the pedestal 10. Also mounted upon the pedestal, at the right thereof as viewed from the front of the apparatus, is a bracket-like bearing structure 23 that is disposed parallel to structure 20, and is formed with a forwardly-extending horizontal arm 24 disposed parallel to arm 22 and in the same horizontal plane as the latter. Extending from arm 22 to arm 24, adjacent the front and rear thereof are two parallel, laterally grooved rails 25, 25 that are bolted to the respective arms. The rails 25 each constitute one ball-race for ball bearings 26, 26, the latter being confined between said rails and respective laterally grooved gibs 27 that are mounted upon the under side of a slide 28, the arrangement being such that the slide may move laterally back and forth between the arms 22, 24. The slide 28 has its upper surface in alignment with the upper face of arm 22, and is formed integrally with an overhanging arm 29 that is parallel and in horizontal alignment with arm 21, said arm 29 being united with the slide at the rear thereof.

For reciprocating the slide 28 laterally, upon occasion, during the operation of the apparatus, a fluid pressure operated cylinder 31 is provided. Said cylinder is horizontally disposed, and at its rear end is pivotally connected to a horizontal bar 32 that is supported at its respective ends upon the bearing structures 20, 23. At the forward end of cylinder 31 the piston rod thereof is connected to a yoke 33, and the forward end of the latter is pivotally connected to two links 34, 34, Figure 3, which links are disposed in angular relation to each other, one of said links having its forward end pivotally connected to the arm 24, the other link having its forward end pivotally connected to the slide 28, on the under side thereof. The arrangement constitutes a toggle mechanism by means of which the slide may be urged toward the arm 22 with great force.

Figures 3, 4, 5:
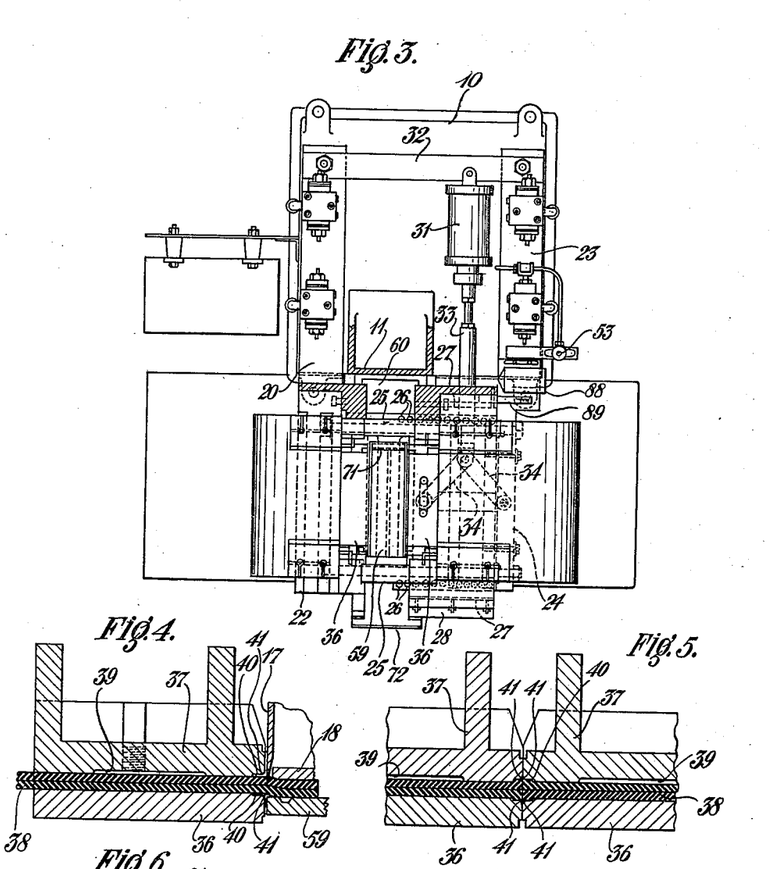
Figure 3 is a section on the line 3—3 of Figure 1.
Figure 4 is a detail sectional view, on a larger scale, of a pair of gripper jaws and a cutter, and the work confined in said jaws and being trimmed by said cutter.
Figure 5 is a detail sectional view, on a larger scale, of two pairs of gripper jaws in abutting relation, and the work therein, as they appear during the butt-splicing operation.

In the trimming and splicing of a tube by means of this apparatus, each tube end is engaged by gripper mechanism, each of said mechanisms comprising a lower die and an upper die, the latter being vertically reciprocable so that a tube-end may be confined between each pair of dies. The lower dies, each designated 36, are mounted upon the top of arm 22 and slide 28, in slightly overhanging relation to the adjacent lateral margins of said arm and slide. Upper die members, each designated 37, are positioned in vertical alignment with the respective lower dies. The dies are adapted to confine the respective ends of a work-piece of the nature of a length of unvulcanized rubber tubing 38, the latter being in collapsed form so that the walls thereof are together and thus constitute a two ply structure. The profile of the dies 36, 37 is best shown in Figures 4 and 5 wherein it will be seen that upper die 37 is longitudinally recessed at 39 to permit of some displacement of the rubber structure 38 under pressure. Along that margin of each die from which the surplus stock of the tube-ends protrudes, the work-engaging face of each die is slightly relieved or recessed at 40, the arrangement being such that pressure upon the work is relieved at this region and the projecting ends of the work are not distorted or flexed out of position as they otherwise would be. The dies are each beveled at the juncture of the recess 40 and the adjacent lateral face of the die, as shown at 41, 41.

Each of the upper dies 37 is provided with individual supporting means, and means by which it is vertically reciprocated, and since said means are of identical construction, the same reference numerals will be used for both. Each die 37 is mounted upon the under side of a die-holder or head 43, being retained thereon by means of a locking pin 44. Each head 43 is supported upon the lower ends of a pair of parallel, vertically disposed racks 45, 45 said racks being slidably mounted in the overhanging arms, one pair in arm 21 and the other pair in arm 29. Mounted atop of arms 21, 29 are bearing brackets 46, 47, in each pair of which is journaled a horizontal shaft 48, and each of the latter carries a pair of pinions 49, 49 that mesh with respective racks 45. Mounted atop of each bearing bracket 46 is a vertically disposed, double-acting fluid pressure cylinder 50 having a downwardly extending piston rod 51, the latter being formed with rack teeth that mesh with the adjacent pinion 49, on the opposite side of the latter from rack 45. Manually operable valves 52, 52 are mounted upon the respective brackets 46 for effecting the charging of the lower ends of cylinders 50 to lower the upper dies 37, the arrangement requiring the use of both hands of the operator, so that the hands cannot be in a place of danger as the dies descend. The upper ends of the cylinders 50 are charged and the lower ends thereof discharged automatically after a determinate time interval by means subsequently to be described, but a manually operable relief valve 53 is mounted upon one side of the apparatus for effecting the lifting of the die heads 43 at an earlier time if desired.

Figure 9:
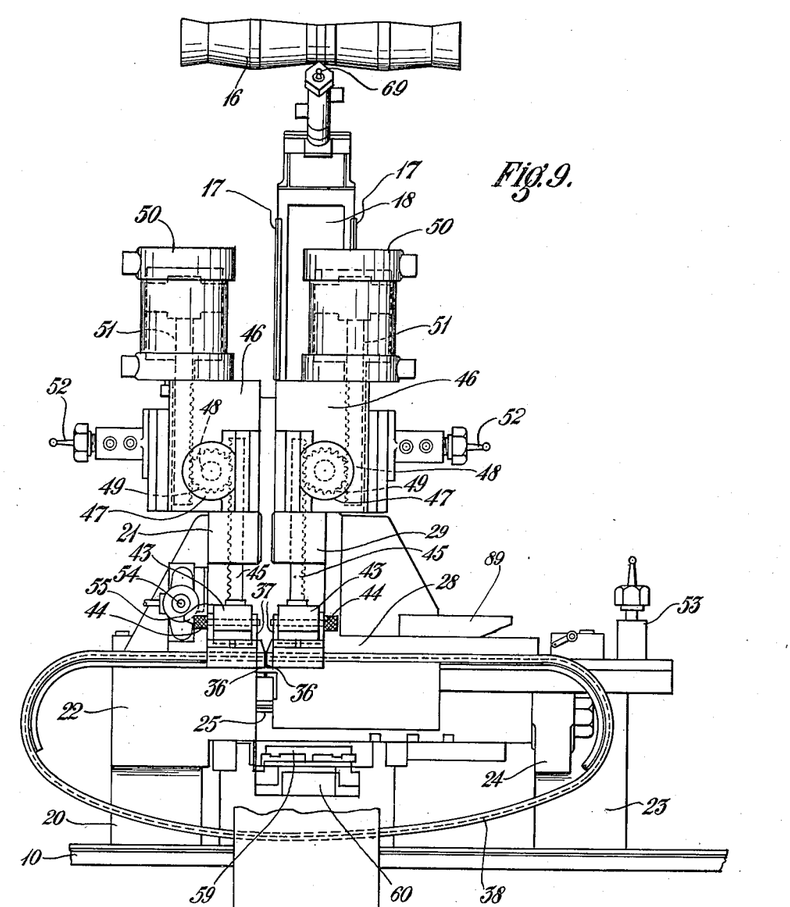
Figure 9 is a view of the structure shown in Figures 7 and 8 in the work-splicing position.
Figure 11:
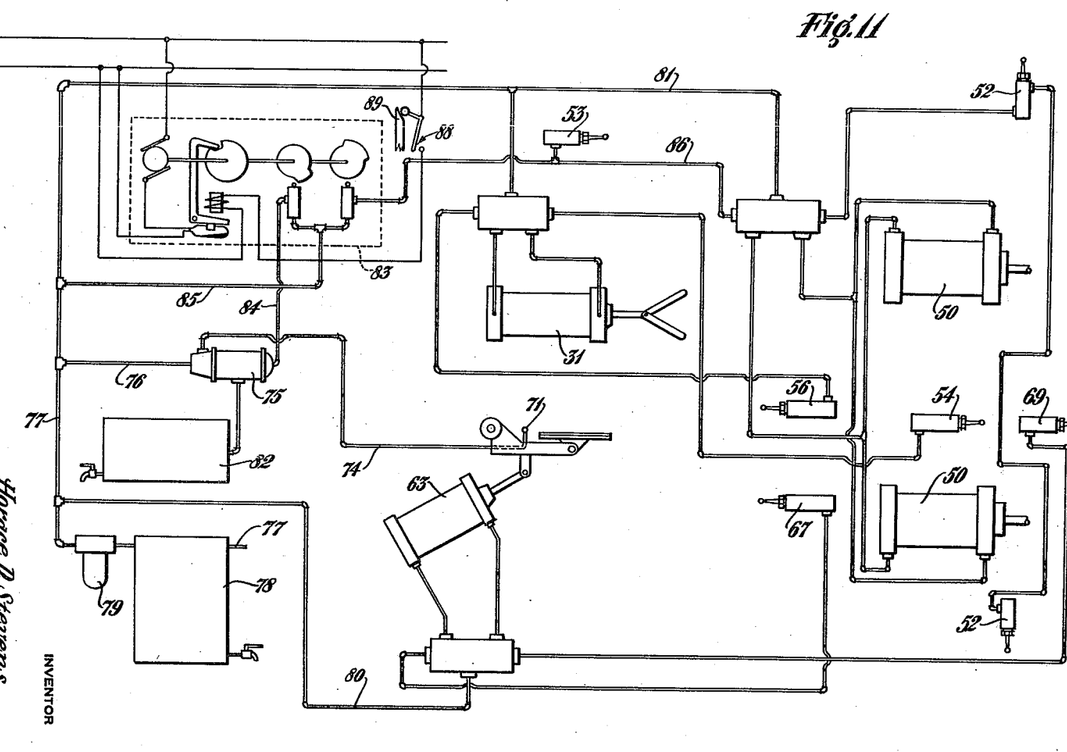
Fig. 11 is an integrated piping and wiring diagram of the apparatus.

Mounted upon a stationary structure between arms 21, 22 is a fluid pressure valve 54 that is operated by a suitable cam 55 mounted upon the outer lateral face of the left die-head 43, said valve controlling the flow of fluid to the front end of cylinder 31. The cam 55 is so constructed and arranged that it operates valve 54 only upon rising movement of the die-head 43, the arrangement being such as automatically to effect lateral movement of the slide 28, to effect separation of the lower die members 36 after the upper die members 37 rise at the end of a splicing operation. The rear end of cylinder 31 is arranged to be charged automatically, with discharge of the front end thereof, to move the slide 28 toward arm 22, and to this end a valve 56, Fig. 11, controlling the flow of fluid to the rear end of cylinder 31 is mounted upon the bracket 11 in position to be engaged by an operating cam 57 mounted upon the far side of counterweight 14 is viewed in Figure 1. The cam 57 is so constructed and arranged as to operate said valve only when the counterweight is moving downwardly, at which time the arm 13 is substantially in the elevated, inoperative position shown in Figure 1.

Severing of the surplus material at the ends of tube 38 is effected by the heated cutter blades 17, which blades cut against a cutter plate 59 that is positionable beneath the end portions of the tube that project from between each pair of dies 36, 37. The cutter plate 59 is pivotally mounted in its medial region upon the free end of a swingable arm 60 that is pivotally mounted at 61 between a pair of ears formed on the front margin of bracket 11. A light leaf spring 62 is carried on arm 60 in engagement with one end portion of cutter plate 59 for maintaining the latter yieldingly in determinate angular position with relation to arm 60. Arm 60 is moved angularly about its pivot 61 by means of a double-acting fluid pressure operated cylinder 63 that is pivotally mounted at 64 upon a bracket on pedestal 10, below said arm 61, the piston rod of said cylinder extending upwardly therefrom and being pivotally connected to the arm at 65. When the lower end of cylinder 63 is charged, the free end of arm 60 is in elevated position, the cutting plate 59 thereon being disposed between the lower dies 36 with its upper surface in contact with the surplus material of the tube-ends projecting from between the upper and lower dies, as is best shown in Figure 4. The arrangement is such that the presser plate 18 will hold the tube ends against the cutting plate 59 while the blades 17 sever the material by cutting against said cutter plate 59.

Figure 1:
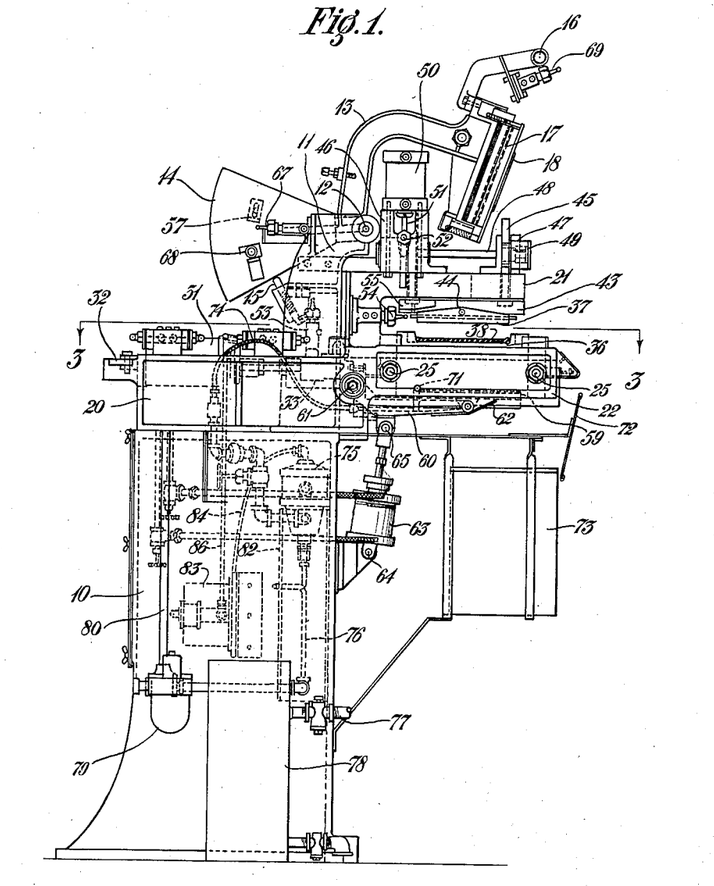
Figure 1 is a side elevation of apparatus embodying the invention, in its preferred form.

The arm 60 is arranged to be raised automatically to operative position, and to this end charging of the lower end of cylinder 63 and concurrent discharge of the upper end thereof is effected through the agency of a valve 67 that is mounted upon bracket 11, and operated by a dog or cam 68 secured to the near side of counterweight 14, as viewed in Figure 1. The cam 68 is so constructed as to operate valve 67 only when said cam is moving upwardly, at which time the arm 13 is moving downwardly. For discharging the lower end of cylinder 63 and concurrently charging the upper end thereof to lower the cutting plate to the inoperative position shown in Figure 1, a manually operable valve 69 is provided, which valve is mounted upon the outer end of arm 13, between the hand grips 16 thereon.

Located at the rear end of cutter plate 59 is a nozzle 71 from which jets of air under pressure are discharged lengthwise of the cutter plate to remove the work-trimmings therefrom, after the cutter plate has been moved downwardly to its inoperative position. Trimmings blown from the cutter plate strike a guard plate 72 at the front of the apparatus and drop into a suitable receptacle 73 positioned therebeneath. Nozzle 71 is located at the delivery end of a pressure line 74 that extends to a diaphragm valve 75 located within the pedestal 10, said valve being connected by a pipe 76 with a main air supply pipe 77. There is a water separator 78 and an airline lubricator 79 interposed in the pipe line 77. Also connected to main supply pipe 77 is a pipe line 80 that provides the pressure for operating cylinder 63 through the agency of valves 67 and 69. Another pipe line 81 connected to main supply pipe 77 provides the pressure for operating cylinder 31 under control of valve 54 and the valve 56 on the far side of counterweight 14, and for operating cylinders 50 under control of valves 52, 53 and a timing device, as presently will be explained. The diaphragm valve 75 exhausts into an exhaust tank 82 located within the pedestal. Said diaphragm valve is automatically operated, to effect discharge of fluid from the nozzle 71, by means of an electrically operated timing device 83 with which said valve is operatively connected by means of pipe 84. There is a fluid inlet to the timer 83 through a pipe 85 that has connection with the main supply pipe 77. A fluid delivery pipe 86 from the timer 83 supplies the fluid for controlling the operation of cylinder 50.

The operation of the timing device 83 is electrically controlled by means of a switch 88 located atop of structure 23, said switch having an operating lever that is engaged by a cam 89 on slide 28, to open the switch when said slide is in the inoperative position shown in Figures 1, 2, 3, 7 and 8. The switch is closed when the slide is in the splicing position shown in Figure 9. The timer has an operative cycle of about 32 seconds after switch 88 is closed.

An important feature of the invention is the position of the pivot 12 of the cutter arm 13 with relation to the position of the work to be trimmed. Because this pivot point is above and slightly to one side of the work, the cutter blades 17 will be substantially in horizontal position and parallel to the work when they engage the latter, and will be traveling in an arc, as is best shown in broken lines in Figures 10. The arrangement is such that the blades 17 move a horizontal distance of ⅝ inch in the last ¼ inch of their cutting stroke, with the result that the surplus ends of the work are severed with a slicing action. This manner of severing the work is considered superior to a chopping or guillotine effect, or to cutting by means of a rotary cutter, and the severed tube-ends are in prime condition for the subsequent butt splicing operation.

Figure 7:
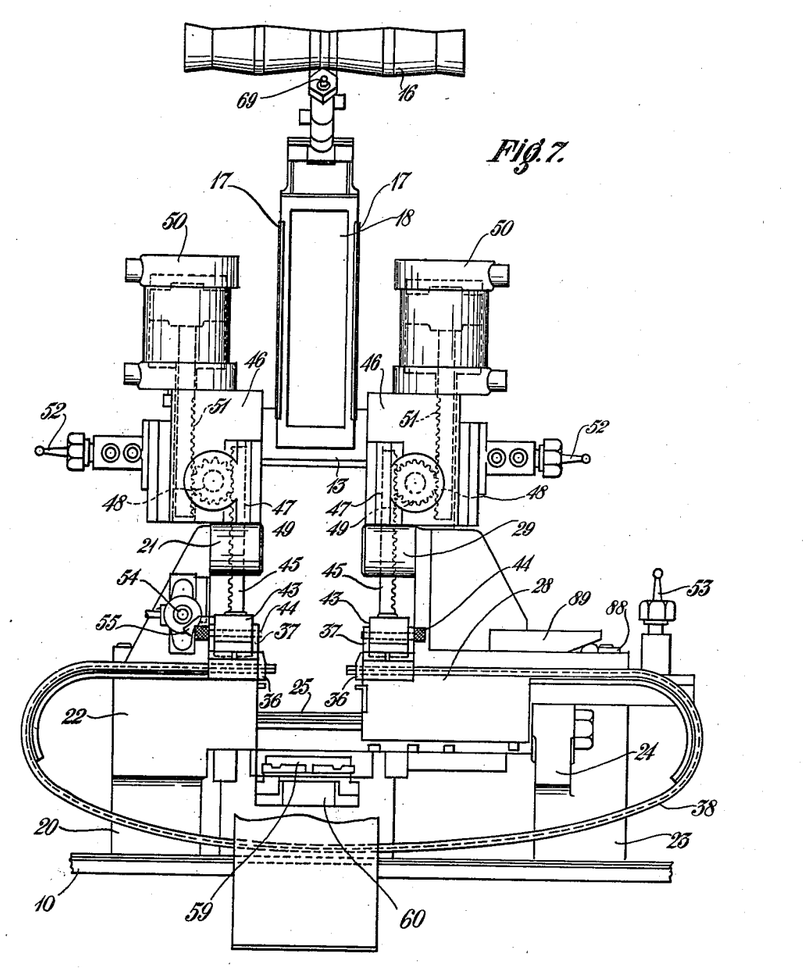
Figure 7 is a front elevation, on a larger scale, of the instrumentalities that operate upon the work, and the work clamped therein, preliminary to the severing of surplus material from the ends of the work.
Figure 10:
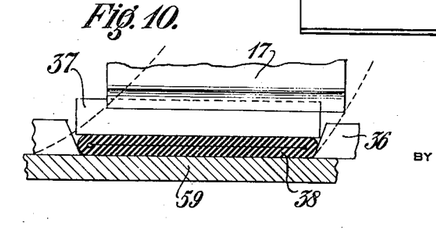
Figure 10 is a somewhat diagrammatic view showing the course traversed by the cutter in the severing of surplus material from the work-piece.

In the operation of the apparatus, with the latter in the inoperative position shown in Figures 1, 2, 3 and 7, the operator mounts the length of unvulcanized rubber tubing 38 in the apparatus by laying the ends thereof over the respective lower die members 36, with the ends thereof projecting about half an inch beyond the adjacent lateral faces of the said die members, as best shown in Figures 4 and 7. The operator then, by the use of both hands, concurrently operates both valves 52 which effects the charging of the lower ends of cylinders 50 and thus causes upper die members 37 to descend and thus to confine the tube-ends between themselves and lower die members 36, as shown in Figure 7. During the lowering of the upper dies, cam 55 on one of the die heads passes by valve 54 without operating the latter. As soon as the work is confined as described, the operator grasps hand grips 16 and pulls the arm 13 and cutting device thereon downwardly, thus lifting counterweight 14. As the latter rises, cam 68 engages and operates valve 67 with the result that pressure fluid is admitted to the lower end of cylinder 63, thereby to elevate the cutter plate 59 into operative position below the work-ends to be trimmed. The cutting device descends in an arcuate course upon the work, as shown in Figure 10, the presser plate 18 yieldingly pressing the material to be trimmed against the plate 59 while the heated blades sever the work with a slicing action, close to but slightly spaced from the adjacent lateral faces of the dies 36, 37, as shown in Figure 4.

Figure 2:
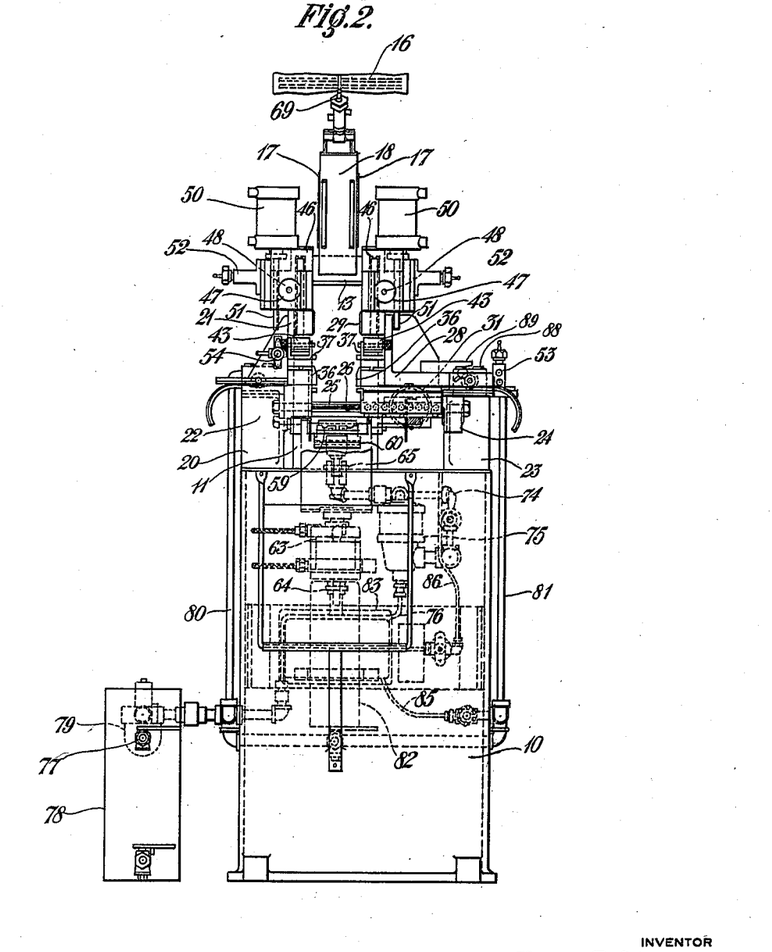
Figure 2 is a front elevation thereof.
Figure 6:
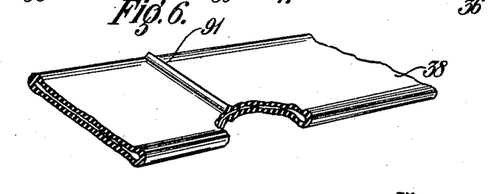
Figure 6 is a fragmentary view of a spliced tube in the region of the splice, a part of the latter being broken away and in section.
Figure 8:
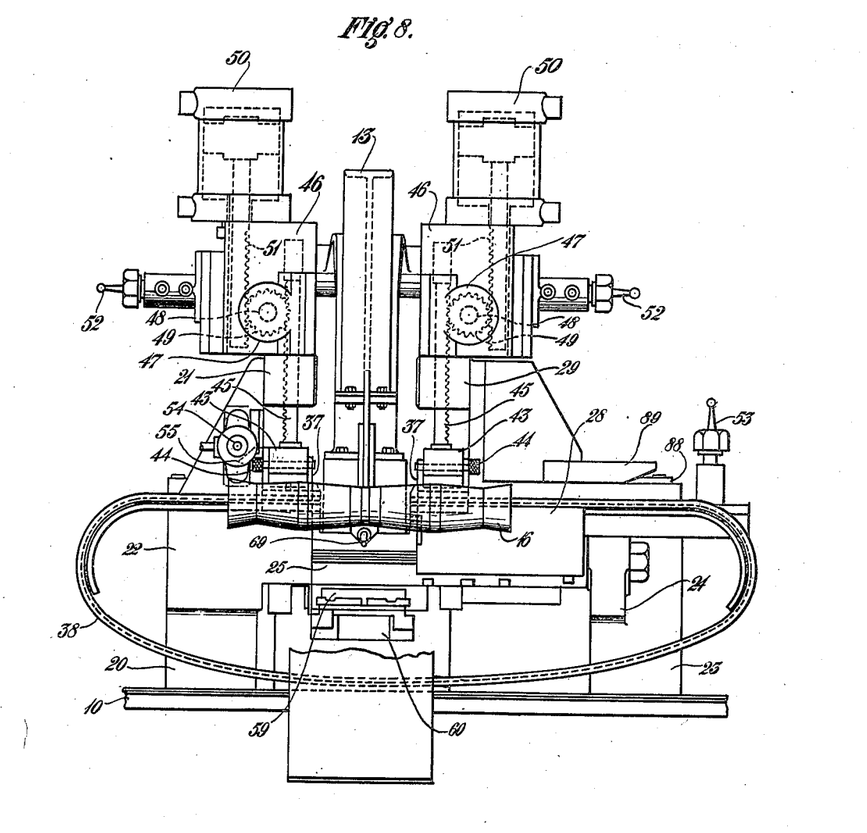
Figure 8 is a view of the structure shown in Figure 7 in the trimming position.

As soon as the blades 17 have cut through the work, the operator manually operates valve 69 which discharges the lower end of cylinder 63 and concurrently charges the upper end thereof, thus moving cutter plate 59, with the severed work-ends thereon, downwardly to the inoperative position shown in Figures 1, 2 and 8. Immediately after operating valve 69, the operator raises the cutting device and arm 13 and restores them to inoperative position. As the counterweight 14 moves downwardly to inoperative position, the cam 57 thereon operates the valve 56 on the far side of bracket 11, with the result that fluid pressure is admitted to cylinder 31 to charge the rear end thereof, and thus to project its piston rod 33 forwardly. Said piston rod, acting through toggle links 34, moves the slide 28 laterally to the left as viewed in Figures 2, 3, 7 and 8, thus bringing the respective pairs of dies 36, 37 into laterally abutting relation, as shown in Figures 5 and 9. Because the trimmed tube-ends project slightly beyond the die faces, they are brought forcibly into abutting relation by the said movement of the slide 28, the bevelled margins 41 of the dies enabling a slight upsetting of the tube ends at their juncture and providing a slightly increased thickness at the splice, as shown in Figures 5 and 6. When the slide 28 moves laterally as described, the cam 89 thereon moves out of engagement with the operating lever of electrical switch 88, thereby effecting the closing of the switch and the setting into operation of the timing device 83.

The immediate result of the operation of the timing device is to actuate diaphragm valve 75 and thus to cause a blast of air under pressure to be directed lengthwise of the cutter plate 59 to remove therefrom any work-trimmings that may be adhered thereto, said trimmings dropping into the receptacle 73. The timing device is set to run for about 32 seconds before actuating any of the other instrumentalities of the apparatus. During this interval the various elements are in the splicing position shown in Figure 9, the tacky tube-ends having ample time to unite in a strong, adherent juncture.

At the expiration of the stated time interval, the timing device operates to effect the charging of the upper ends of both cylinders 59 with concurrent discharge of the lower ends thereof, with the result that the upper dies 37 are lifted off the work. As the die heads 43 rise, cam 55 on one of them operates valve 54, and thus causes fluid pressure to enter the front end of cylinder 31 with concurrent discharge of the rear end thereof. This causes piston rod 33 to move rearwardly and moves slide 28 back to its inoperative position. At the termination of the retractive movement of slide 28, cam 89 thereon opens switch 88 and causes timing device 83 to cease operation. This completes a cycle of operation of the apparatus, and the work 38, in endless form, may be removed therefrom. As shown in Figure 6, the finished tube 38 has an external ridge 91 at the region of the splice, but such ridge disappears when the tube subsequently is vulcanized by heat while in a mold and under internal pressure.

The automatic features of the apparatus conserve time and labor. The feature of holding the tube-ends in abutting relation for a determinate interval results in a superior splice and makes for uniformity of the product. The splicing interval need not be wasted, but may be utilized by the operator for attending another tube splicing apparatus. As previously stated, the arrangement whereby the cutters severs surplus material from the work with an oblique, slicing stroke is an important feature in the proper preparation of the tube-ends for subsequent splicing, and the simple construction whereby said slicing action is obtained makes for efficiency of operation and low cost of manufacture and maintenance.

Modification may be resorted to without departing from the spirit of the invention, or the scope thereof as defined by the appended claims.

What is claimed is:

1. In tube splicing apparatus, the combination of a pair of work-gripping structures relatively movable from and toward each other, a cutter movable between said work-gripping structures, when they are in spaced apart relation, for severing surplus work-material projecting from said structures, means for relatively moving said work-gripping structures, a timing device, and control means for said timing device that puts the latter into operation when the work-gripping means are moved toward each other, said timing device being adapted to cause separation of the work-gripping means after a determinate time-interval.

2. In tube splicing apparatus, the combination of a pair of work-gripping structures, means for moving the same relatively from and toward each other, a cutter manually movable to and from a position between said work-gripping structures, when they are spaced apart from each other, for severing surplus work-material projecting from said structures, a cutter plate movable to a position between the work-gripping structures for co-operation with the cutter to sever the work-material, and means operated by the cutter as it approaches the work for moving the cutter plate into operative position for co-operation with the cutter.

3. In tube splicing apparatus, the combination of a pair of work-gripping structures, a fluid pressure operated cylinder, a toggle operatively connected to the latter and to one of the work-gripping structures at least, for moving said structures relatively from and toward each other, a cutter movable into and out of position between the work-gripping structures when the same are positioned apart from each other, means controlled by the cutter as it recedes from the position between the work-gripping structures for effecting operation of the fluid pressure cylinder to move said structures toward each other, a timing device controlling the reversal of the action of the fluid pressure cylinder to effect the moving apart of the work-gripping structures, and means operated by movement of said work-gripping structures for setting the timing device into operation.

4. In tube splicing apparatus, the combination of a pair of opposed work-gripping structures, each comprising a stationary lower die and a vertically movable upper die, respective fluid pressure cylinders for vertically moving said upper dies, means for moving the work-gripping structures as a unit from and toward each other to effect the butt splicing of tube-ends mounted therein, time-controlled means for operating the fluid pressure cylinders to raise the upper dies from the work, and means actuated by the upward movement of said dies for effecting separation of the work-gripping structures as a unit.

5. Tube splicing apparatus comprising the combination of a pair of opposed work-gripping structures movable from and toward each other, a cutter movable into and out of cutting position between said structures when they are spaced from each other, said cutter comprising a pair of parallel blades, and means for moving said blades in an arc to and from said cutting position, said blades being so positioned with relation to their arc of movement as to pass through the work with a slicing motion.

6. Tube splicing apparatus comprising the combination of a pair of opposed work-gripping structures movable from and toward each other, and a cutter for severing work in said structures when they are spaced apart from each other, said cutter comprising a pivotally mounted arm, and a pair of straight-edged cutting blades carried thereby in non-radial relation to its axis of movement.

7. Tube splicing apparatus comprising the combination of a pair of opposed work-gripping structures adapted to confine the respective ends of a tube in flattened condition, means for moving said work-gripping structures relatively from and toward each other, and a cutter for severing work in said structures when they are spaced apart from each other, said cutter comprising a pivotally mounted arm and a pair of parallel, straight-edged blades mounted at the free end of said arm in nonradial relation to the axis thereof, the pivot of said arm being so positioned with relation to the work that the blades will pass therethrough with a movement that has a component parallel to the plane of the work and a component that is normal thereto.

HORACE D. STEVENS.